(12) United States Patent
Kharul et al.

(10) Patent No.: US 9,987,599 B2
(45) Date of Patent: Jun. 5, 2018

(54) ASYMMETRIC MEMBRANES BASED ON BUPBI

(71) Applicant: Council of Scientific & Industrial Research, Rafi Marg, New Delhi (IN)

(72) Inventors: Ulhas Kanhaiyalal Kharul, Pune (IN); Deepti Gangaram Bhagat, Pune (IN); Harshal Dilip Chaudhari, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days. days.

(21) Appl. No.: 15/033,773

(22) PCT Filed: Oct. 31, 2014

(86) PCT No.: PCT/IN2014/000693
§ 371 (c)(1),
(2) Date: May 2, 2016

(87) PCT Pub. No.: WO2015/063792
PCT Pub. Date: May 7, 2015

(65) Prior Publication Data
US 2016/0296892 A1  Oct. 13, 2016

(30) Foreign Application Priority Data

Nov. 2, 2013 (IN) .......................... 2594/DEL/2013

(51) Int. Cl.
*B01D 53/22* (2006.01)
*B01D 71/62* (2006.01)
(Continued)

(52) U.S. Cl.
CPC ......... *B01D 71/62* (2013.01); *B01D 67/0009* (2013.01); *B01D 67/0011* (2013.01);
(Continued)

(58) Field of Classification Search
CPC .......... B01D 2325/022; B01D 67/0013; B01D 2323/06; B01D 67/0011; B01D 71/62;
(Continued)

(56) References Cited

U.S. PATENT DOCUMENTS 3,518,234 A * 6/1970 Yoshida .................. C08G 73/18
264/331.19
3,584,104 A * 6/1971 Bohrer ..................... D01D 5/16
264/205
(Continued)

FOREIGN PATENT DOCUMENTS

WO    WO 2010097681 A1 * 9/2010 ............. B01D 61/00

OTHER PUBLICATIONS

Kumbharkar et al. "Investigation of gas permeation properties of systematically modified polybenzimidazoles by N-substitution" Journal of Membrane Science 357 (2010) 134-142.*
(Continued)

*Primary Examiner* — Anthony Shumate
(74) *Attorney, Agent, or Firm* — John P. White; Cooper & Dunham LLP

(57) ABSTRACT

Asymmetric membranes in hollow fiber and flat sheet forms are disclosed herewith. The process of preparation of the membranes is further disclosed. The membranes are characterized and find application in the separation of gases and solutes.

11 Claims, 9 Drawing Sheets

(51) Int. Cl.
  *B01D 67/00* (2006.01)
  *B01D 71/82* (2006.01)
  *B01D 69/06* (2006.01)
  *B01D 69/08* (2006.01)

(52) U.S. Cl.
  CPC ......... *B01D 67/0013* (2013.01); *B01D 69/06* (2013.01); *B01D 69/087* (2013.01); *B01D 71/82* (2013.01); *B01D 2323/06* (2013.01); *B01D 2325/022* (2013.01)

(58) Field of Classification Search
  CPC .. B01D 67/0009; B01D 69/087; B01D 71/82; B01D 69/06
  See application file for complete search history.

(56) References Cited

U.S. PATENT DOCUMENTS

| | | | | |
|---|---|---|---|---|
| 5,565,149 A * | 10/1996 | Page | ................. | B01D 19/0031 210/321.8 |
| 5,779,897 A * | 7/1998 | Kalthod | ................. | B01D 53/22 210/321.8 |
| 2004/0013819 A1* | 1/2004 | Hou | ................. | B82Y 15/00 427/580 |
| 2010/0323573 A1* | 12/2010 | Chu | ................. | B01D 65/08 442/153 |
| 2011/0266222 A1* | 11/2011 | Wang | ................. | B01D 63/02 210/650 |
| 2012/0000852 A1 | 1/2012 | Kharul et al. | | |
| 2013/0118983 A1* | 5/2013 | Livingston | ........... | B01D 61/027 210/654 |
| 2014/0008292 A1* | 1/2014 | Wang | ................. | B01D 61/002 210/500.23 |
| 2016/0375410 A1* | 12/2016 | Berchtold | ............ | B01D 61/362 95/55 |

OTHER PUBLICATIONS

Kumbharkar et al. "Enhancement of gas permeation properties of polybenzimidazoles by systematic structure architecture" Journal of Membrane Science 286 (2006) 161-169.*

International Search Report, dated Mar. 20, 2015, in connection with PCT International Application No. PCT/IN2014/000693, filed Nov. 2, 2014.

International Publication No. WO 2015/063792 A1 in Connection with PCT International Application No. PCT/IN2014/000693, filed Nov. 2, 2014.

Kumbharkar et al.: "N-substitution of polybenzimidazoles: Synthesis and evaluation of physical properties", European Polymer Journal, Pergamon Press Ltd. Oxford, GB, vol. 45, p. 3363-3371 (2009).

* cited by examiner

ASYMMETRIC MEMBRANES BASED ON BUPBI

TECHNICAL FIELD OF INVENTION

The present invention relates to asymmetric membranes based on tert-butyl-polybenzimidazole (BuPBI), where the asymmetric membranes possess dense or porous skin and highly porous sub-structure. The invention further relates to the preparation of asymmetric membranes based on tert-butyl-polybenzimidazole (BuPBI) of varying inherent viscosity. The invention further relates to the preparation of flat sheet as well as hollow fiber membrane based on tert-butyl-polybenzimidazole (BuPBI).

BACKGROUND AND PRIOR ART

The suitable selection of the membrane based on porosity allows its effective industrial application such as gas separation, nanofiltration, ultrafiltration, prefiltration, clarification, acid separation etc. The separation performance, especially flux and selectivity are a function of the nature of the membranes. To increase the permeability of the membrane, asymmetric membranes were developed that overcomes the disadvantages of the symmetric membrane The characteristic feature of asymmetric membranes is the presence of a thin, selective top layer (skin) and a porous sublayer with large through pores, which minimizes the mass transfer resistance of membranes. Asymmetric membranes can have either a nonporous or a porous skin. The latter membranes can be used as supports in the composite membranes or as independent porous films in various pressure-driven processes (reverse osmosis, microfiltration, ultrafiltration, and nanofiltration).

Morphology and the transport properties of asymmetric membrane can be controlled by the selection of polymer, in the process of preparation, the preparation conditions, the solvents used and other such parameters. It has been well documented in the literature that water soluble macromolecules adsorb readily on the polymeric ultrafiltration membranes [Ultrafiltration Membranes and Applications, Polym. Sci. Tech., 13, 1981, pp. 141-158].

In most known cases, asymmetric membranes are cast from solutions of polymers based on homologous series of cellulose esters, aromatic polyimides, or polysulfones, polyolefins, etc.

An article titled "Separation performance of asymmetric membranes based on PEGDa/PEI semi-interpenetrating polymer network in pure and binary gas mixtures of $CO_2$, $N_2$ and $CH_4$" by Sundar Saimani, Mauro M. Dal-Cin et al in Journal of Membrane Science, Volume 362, Issues 1-2, Pages 353-359, 2010 relate to asymmetric membranes of semi-interpenetrating polymer networks (semi-IPN) prepared with commercial poly (ether imide) (ULTEM®) and poly (ethylene glycol) diacrylate (PEGDa) in 1-methyl-2-pyrrolidinone (NMP).

Article titled "Preparation and characterization of highly selective dense and hollow fiber asymmetric membranes based on BTDA-TDI/MDI co-polyimide" by J. N. Barsema, G. C. Kapantaidakis et. al in Journal of Membrane Science, Volume 216, Issues 1-2, Pages 195-205, 2003 report the preparation, characterization, and the permeation properties of dense flat sheet and asymmetric hollow fiber membranes, based on BTDA-TDI/MDI co-polyimide.

Polybenzimidazole (PBI) to be used as a membrane material is attracting considerable attention due to its excellent thermochemical and mechanical stability.

US 2012/0000852 discloses membrane comprising polybenzimidazole and aromatic polyester wherein said aromatic polyester is removed. The membrane is used for a process of deacidification.

U.S. Pat. No. 6,623,639 discloses method of making a polybenzimidazole microporous hollow fiber membrane in presence of polyvinyl pyrollidinone and n-propanol. U.S. Pat. No. 4,842,740 discloses membranes produced from the blend of polybenzimidazole polymers and polyarylate polymers.

Further fabrication of polybenzimidazole (PBI) nanofiltration hollow fiber membranes for removal of chromate from wastewater is disclosed in Journal of Membrane Science Vol 281, Issues 1-2, 15 Sep. 2006, Pages 307-315 by Kai Yu Wang et al. Ulhas K. Kharul et al. in European Polymer Journal Volume 45, Issue 12, December 2009, Pages 3363-3371 discloses synthesis of series of N-substituted Polybenzimidazoles (PBI) using selective alkyl groups with varying bulk and flexibility, viz., methyl, n-butyl, methylene trimethylsilane and 4-tert-butylbenzyl. PBI-I based on 3,3'-diaminobenzidine (DAB) and isophthalic acid and PBI-BuI based on DAB and 5-tert-butyl isophthalic acid were chosen for N-substitution.

Further Ulhas K. Kharul et al in Journal of Membrane Science 286 (2006) 161-169 discloses enhancement of gas permeation properties of polybenzimidazoles by systematic structure architecture wherein polybenzimidazoles based on 3,3-diaminobenzidene and 5-tert-butyl isophthalic acid or 4,4-(hexafluoroisopropylidene) bis(benzoic acid) exhibited excellent combination of physical and gas permeation properties as compared to the PBI based on isophthalic acid.

The determination of rejection/molecular weight cut off (MWCO) is one of the popular methods to characterize the membrane pore size.

The MWCO is obtained by plotting rejection of selected solutes versus their molar mass, where retention of PEGs in cross-flow ultrafiltration through membranes is reported in Desalination Volume 149, Issues 1-3, 10 Sep. 2002, Pages 417-422 by Samantha Platt.

The polymers used to cast membrane in the art have various limitations. For e.g. Polyimides are not known to operate under more severe temperatures or in corrosive media, in particular, those containing organic solvents, are costly and have limited solubility.

The present inventors have observed that it is mainly the choice of the polymer that predetermines the variety of problems to be tackled such as the physicochemical properties that are inherent in a given polymer that imposes limitations on the choice of solvents and non-solvents and is manifested in the morphology of the corresponding membrane.

In view of the above, BuPBI (tert-butyl-polybenzimidazole), a versatile material of thermo-chemically and mechanically stable PBI family appears to hold more promise in the synthesis of asymmetric membranes whose porosity can be tuned as per the required separation application. Further tert-butyl group in these PBI led to the lowering in packing density, a small reduction in thermal stability and enhanced solvent solubility. While analysing rejection performance, PBI-BuI based membrane was found to exhibit interactions even with the neutral PEG molecules.

OBJECT OF INVENTION

The main objective of the present invention is to provide asymmetric membranes of tunable porosity based on tert-butyl-polybenzimidazole (BuPBI).

Another object of the present invention is to provide a process for preparation of a membrane with tunable porosity.

SUMMARY OF THE INVENTION

The invention discloses asymmetric membrane of BuPBI in hollow fiber and flat sheet forms for separation of gases and solutes.

In an embodiment, the invention discloses asymmetric membrane for separation of solutes in the molecular weight range of 100-1,00,000.

In an aspect, the invention discloses a process for the preparation of asymmetric membrane of BUPBI in hollow fiber and flat sheet forms.

Figure 1:
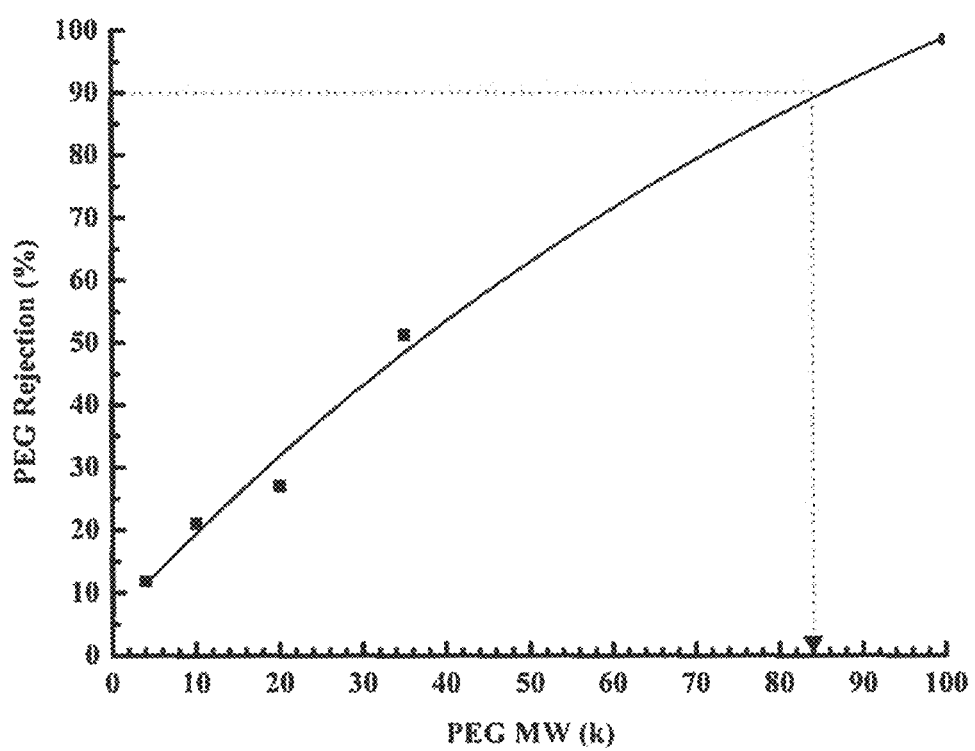
FIG. 1: depicts MWCO of membrane M-1

ABBREVIATIONS (DAB): Diaminobezidine
(BuI): 5-tert-butylisophthalic acid
PBI-BuI/Bu PBI: tert-butyl polybenzimidazole
PPA: Polyphosphoric acid
DMAc: N,N-dimethyl acetamide

DETAILED DESCRIPTION OF INVENTION

The expression 'PBI-BuI' or 'Bu-PBI' or "tert-butylpolybenzimidazole" are used interchangeably throughout the specification and the same may be appreciated as such by the person skilled in the art.

The invention discloses asymmetric membranes based on tert-butyl-polybenzimidazole (BuPBI) with tunable porosity. The invention further discloses BuPBI based flat sheet and hollow fiber membranes.

In an aspect, the invention discloses a process to prepare asymmetric membranes of BuPBI in flat sheet and hollow fibre membrane forms In accordance with the above, the present invention relates to asymmetric membranes, wherein the membrane possess dense or porous skin and highly porous substructure, which can be tuned easily by variation in membrane casting parameters, dope solution composition, membrane post-treatment and such others.

The present invention relates to asymmetric membranes based on tert-butyl-polybenzimidazole (BuPBI) with appropriate inherent viscosity. The asymmetric membranes of the present invention have increased water flux, rejection performance while retaining its characteristic features such as high selectivity solvent stability and thermal stability and find varied industrial applications such as gas separation, nanofiltration, ultrafiltration, chemodialysis and such like.

In an aspect, the present invention provides a simple process for the preparation of flat sheet asymmetric membranes based on tert-butyl-polybenzimidazole (BuPBI) with varying inherent viscosity; wherein the process comprises the steps of;
   a. Preparing a dope solution of tert-butyl-polybenzimidazole (BuPBI) with viscosity in the range of 0.4 dL/g to 4 dL/g and concentration varying from 1 to 50% (w/v) in an organic solvent, optionally in presence of a co-solvent and optionally in presence of an additive;
   b. Casting the dope solution of step (a) using a knife assembly;
   c. Optionally heating the solution of step (b) to a temperature ranging from 40-150° C. and
   d. Allowing the polymer solution of step (b) or step (c) to precipitate in a non solvent to obtain the membrane.

In an aspect, the organic solvent or co-solvent is selected from the group consisting of N-methyl pyrrolidine (NMP), N-methyl-2-pyrrolidine, N,N-dimethyl formamide (DMF), tetrahydrofuran (THF), pyridine, 1,4 dioxane, N,N-dimethyl acetamide (DMAc), dimethyl sulfoxide (DMSO), acetone, dioxane, methane sulphonic acid (MSA), pyridine and chlorinated solvents, either alone or mixtures thereof.

In another aspect, the dope solution of step (a) comprises additives selected from the group consisting of alkali and alkaline earth metal salts, organic acids, polymers and oligomers.

In a preferred embodiment, the alkali and alkaline earth metal salts are selected from lithium chloride (LiCl), lithium bromide (LiBr), AlCl$_3$, KCl; organic acids are selected from malic acid, maleic acid, citric acid, succinic acid, Malonic acid, oxalic acid; polymers and oligomers are selected from Polyethylene glycol (PEG), Polyvinyl alcohol (PVA) and Polyvinylpyrrolidone (PVP).

The non solvent is selected from water alone or at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol or water containing 0-35% w/v of a salt selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate.

In yet another aspect, the PBI-BuI membrane is characterized in presence of polymer solutes, wherein polymers are selected from substituted PBIs, polyimides, PEG, PEO, polyvinyl alcohol, polyester and alike in appropriate proportion with that of PBI-BuI, preferably solute is PEG.

In an embodiment, the process of step (a) comprises at least a second polymer selected from substituted PBIs, polyimides, PEG, PEO, Polyester and such like.

In an aspect, the membrane formed is optionally treated with solution of solvents comprising at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol and water in the ration 1:99 to 99:1, at 25-100° C. for 1 min to 4 days.

In another aspect, the invention provides a process for the preparation of BuPBI based hollow fiber membranes comprising;
   a) Preparing a dope solution of tert-butyl-polybenzimidazole (BuPBI) with viscosity in the range of 0.4 dL/g to 4 dL/g and concentration varying from 1 to 50% (w/v) in an organic solvent, optionally in presence of a co-solvent and optionally in presence of an additive;
b) subjecting the solution of step (a) to spinneret using a non-solvent as bore fluid;
c) Optionally heating the solution of step (b) to a temperature ranging from 25-150° C. and
d) Allowing the polymer solution of step (b) or step (c) to precipitate in a non solvent to obtain the membrane.

These BuPBI hollow fibers are optionally post treated by dipping in a 10-60 wt % aq. glycerol solution and dried in air at room temperature. These dried hollow fibers are potted to obtain hollow fiber modules, the synthesized hollow fibers are analyzed for their internal (ID) and external (OD) diameters, water flux and PEG rejection.

In another aspect, the invention provides hollow fiber membrane based on tert-butyl-polybenzimidazole (BuPBI), wherein the hollow fiber membrane is characterized by average internal diameter (ID) in the range of 293-922 (μm); average external diameters (OD) in the range of 514-1332 (μm), average thickness in the range of 111-201 (μm) (cf Table 10).

The bore fluid is selected from water alone or at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol or water containing 0-35% w/v of a salt, selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate.

In an aspect, the organic solvent or co-solvent is selected from the group consisting of N-methyl pyrrolidine (NMP), N-methyl-2-pyrrolidine, N,N dimethyl formamide (DMF), tetrahydrofuran (THF), pyridine, 1,4 dioxane, N,N dimethyl acetamide (DMAc), dimethyl sulfoxide (DMSO), acetone, dioxane, methane sulphonic acid (MSA), pyridine and chlorinated solvents, either alone or mixtures thereof.

In another aspect, the dope solution of step (a) comprises additives selected from the group consisting of alkali and alkaline earth metal sails, organic acids, polymers and oligomers.

In a preferred embodiment, the alkali and alkaline earth metal salts are selected from lithium chloride (LiCl), lithium bromide (LiBr), Aluminium Chloride (AlCl$_3$). Potassium Chloride (KCl), Lithium Iodide (LiI); organic acids are selected from malic acid, maleic acid, citric acid, succinic acid, Malonic acid, oxalic acid; polymers and oligomers are selected from Polyethylene glycol (PEG), Polyvinyl alcohol (PVA) and Polyvinylpyrrolidone (PVP).

In another aspect, the PBI-BuI hollow fiber membrane is characterized in presence of polymer solutes, wherein polymers are selected from substituted PBIs, polyimides, PEG, PEO, polyvinyl alcohol, polyester and alike in appropriate proportion with that of PBI-BuI, preferably solute is PEG.

The non solvent is selected from water alone or at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol or water containing 0-35% w/v of a salt selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate.

In an embodiment, the process of step (a) comprises at least a second polymer selected from substituted PBIs, polyimides, PEG, PEO, Polyester and such like.

In an aspect, the membrane formed is treated with solution of solvents comprising at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol and water, in the ration 1:99 to 99:1, at 25-100° C. for 1 min to 4 days.

In another aspect, the present invention provides BuPBI based hollow fiber and flat sheet membranes useful for separation such as ultrafiltration, nanofiltration, gas separation, chemodialysis and such like.

Further, the hollow membranes prepared according to the invention may find applications in solvent separation, deacidification, removal of heavy metal ions, removal of strategic metal ions such as uranium and thorium, water treatment, protein extraction, juice production, pharmaceutical, food and beverage industry, bioanalytical, blood fractionation, blood dialysis, petroleum and refinery industry, fuel cell, gas separation and many others.

With reference to the examples, asymmetric membrane disclosed here in flat sheet and hollow fiber membrane forms provide a means for separating gases and solutes.

In a preferred embodiment, the asymmetric membrane separates solutes in the molecular weight in the range of 100-1,00,000.

The following examples, which include preferred embodiments, will serve to illustrate the practice of this invention, it being understood that the particulars shown by way of example, for purpose of illustrative discussion of preferred embodiments of the invention, and are not limiting the scope of the invention.

Example 1: Synthesis of Poly(Tert-Butylbenzimidazole) (BuPBI) with Varying Inherent Viscosity A three-neck round bottom flask equipped with a mechanical stirrer, nitrogen inlet and CaCl$_3$ drying tube was charged with PPA and raised the temperature up to 120° C. 80 g of DAB was added based on the amount of PPA and the reaction temperature was elevated to 140° C. After complete dissolution of DAB, required moles of 5-ter-butylisophthalic acid (BuI) as given in Table 1 was added; temperature was slowly raised to 170° C. and maintained for 5 hours after which, the temperature was further raised to 200° C. and maintained for specific duration as given in Table 1. The ratio of DAB:PPA was varied from 1:25-1:40; while ratio of and DAB:BuI was varied as 1:1-1:1.01 (Table 1). This disturbed stoichiometry was employed in order to get desired viscosity of the polymer; BuPBI. The polymer was obtained by precipitating reaction mixture into stirred water. It was crushed, washed with water, followed by aqueous sodium bicarbonate and again with water. It was dried at 100° C. under vacuum for 7 days.

Obtained polymer was purified by dissolving in DMAc (4%, w/v), precipitated in stirred water, followed by drying at 100° C. under vacuum for 7 days.

Inherent viscosity of BuPBI was measured using 0.2 dL/g solution in conc. $H_2SO_4$ at 35° C. Table 1 details the reaction parameters and inherent viscosity of obtained BuPBI.

TABLE 1

Reaction parameters and variation in viscosity of BuPBI

| Reaction No. | DAB:PPA | DAB:Acid | Duration of reaction at 200° C. (hr) | Inherent viscosity (dL/g) |
|---|---|---|---|---|
| 1 | 1:40 | 1:1.03 | 2.5 | 0.81 |
| 2 | 1:30 | 1:1.01 | 14.5 | 1.48 |
| 3 | 1:35 | 1:1 | 9 | 1.22 |
| 6 | 1:30 | 1:1.01 | 13.5 | 1.38 |
| 7 | 1:25 | 1:1.01 | 10 | 1.29 |
| 8 | 1:35 | 1:1.01 | 8 | 1.33 |

Example 2: Preparation of the Dope Solution (NMP as a Solvent while Varying Polymer Concentration and its Viscosity), Membrane Preparation and Analysis As given in Table 2, the dope solution containing BuPBI with inherent viscosity of 1.48 and 0.81 dL/g and concentration varying from 12 to 22% (w/v) were prepared using NMP (N-methyl pyrolidone) as the solvent. A 4% LiCl (of polymer quantity) was added and the solution was stirred for 48 hours while equipped with reflux condenser at temperature varying from RT to 160° C. The solution was then degassed and centrifuged. The membrane was casted on polypropylene (PP-2470) based non-woven support fabric. The knife gap was varied from 100-350 µm and casting speed was set to 0.1-5 m/min and then passed sequentially through gelation, rinsing and curing baths maintained at temperatures of 5-80° C. (Table 2). The membrane coupons were analyzed for water flux and rejection of polyethylene glycol (PEG). For analyzing PEG rejection, 0.1% solution of PEG prepared using deionized water was passed through the membrane at 2 bar upstream pressure in stirred dead end cell assembly (active area of 12.48 cm²). The PEG concentration in permeate was analyzed by GPC.

Figure 2:
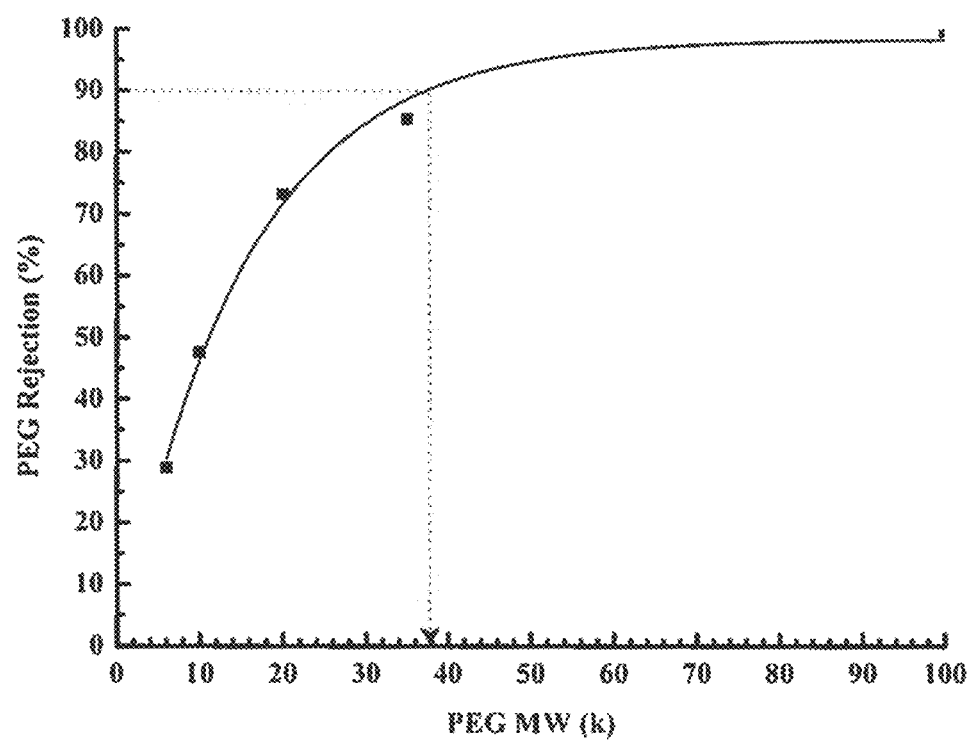
FIG. 2: depicts MWCO of membrane M-2
Figure 3:
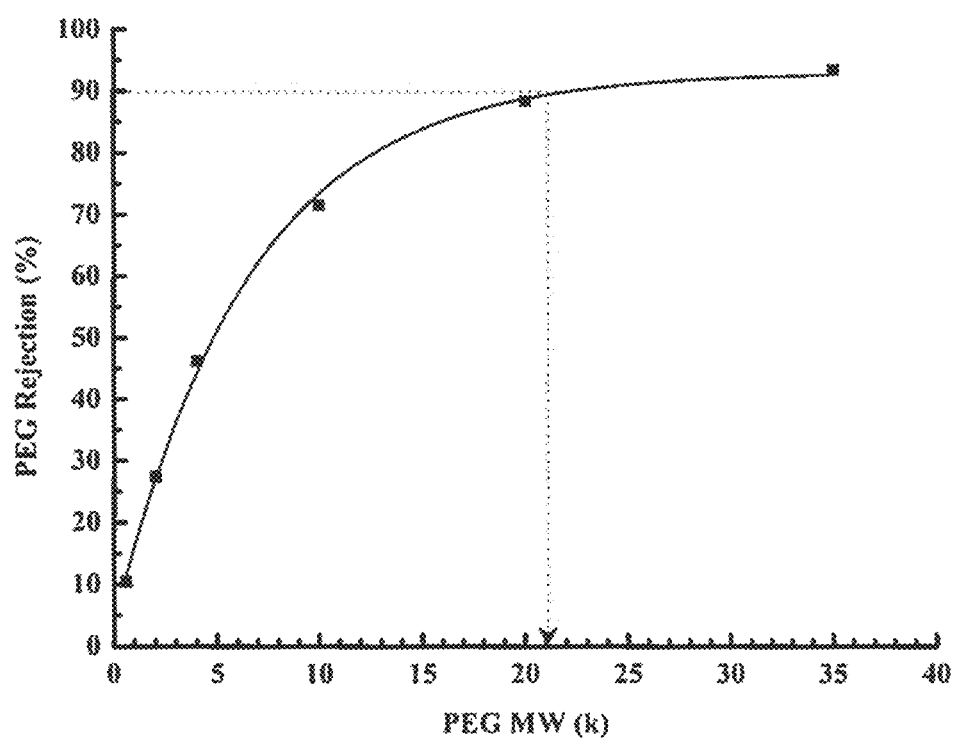
FIG. 3 depicts MWCO of membrane M-3
Figure 4:
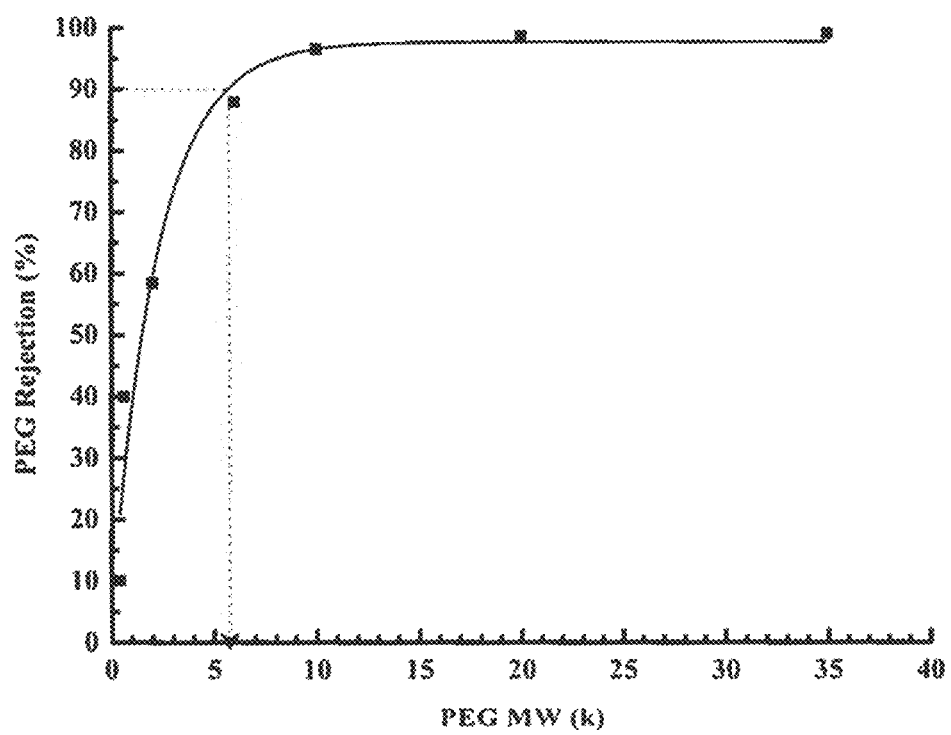
FIG. 4 depicts MWCO of membrane M-4
Figure 5:
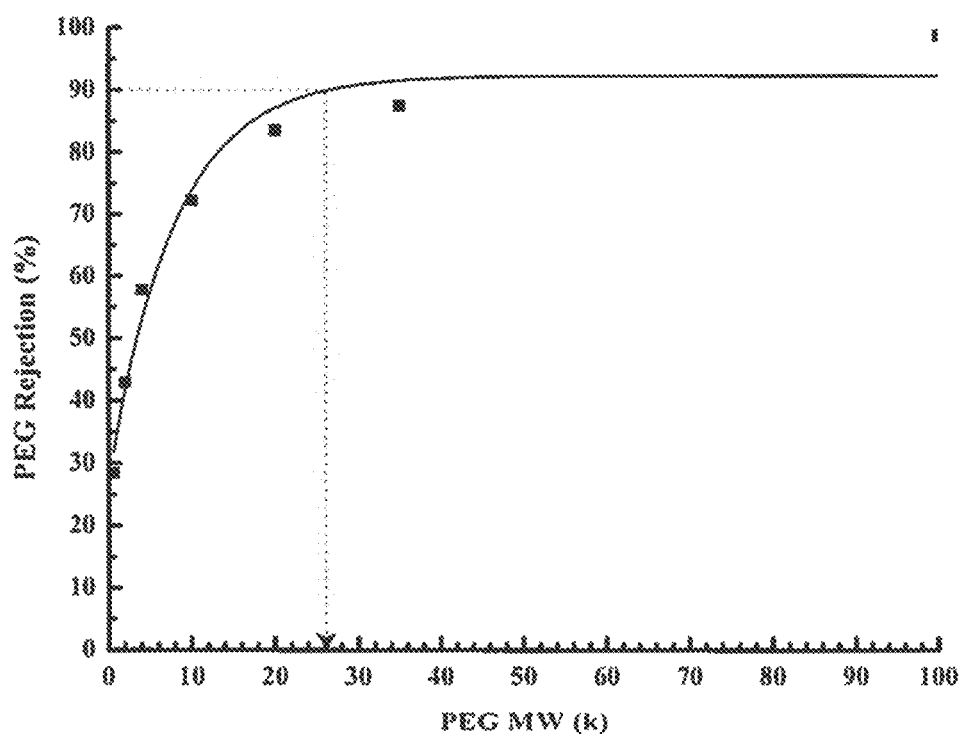
FIG. 5 depicts MWCO of membrane M-5
Figure 6:
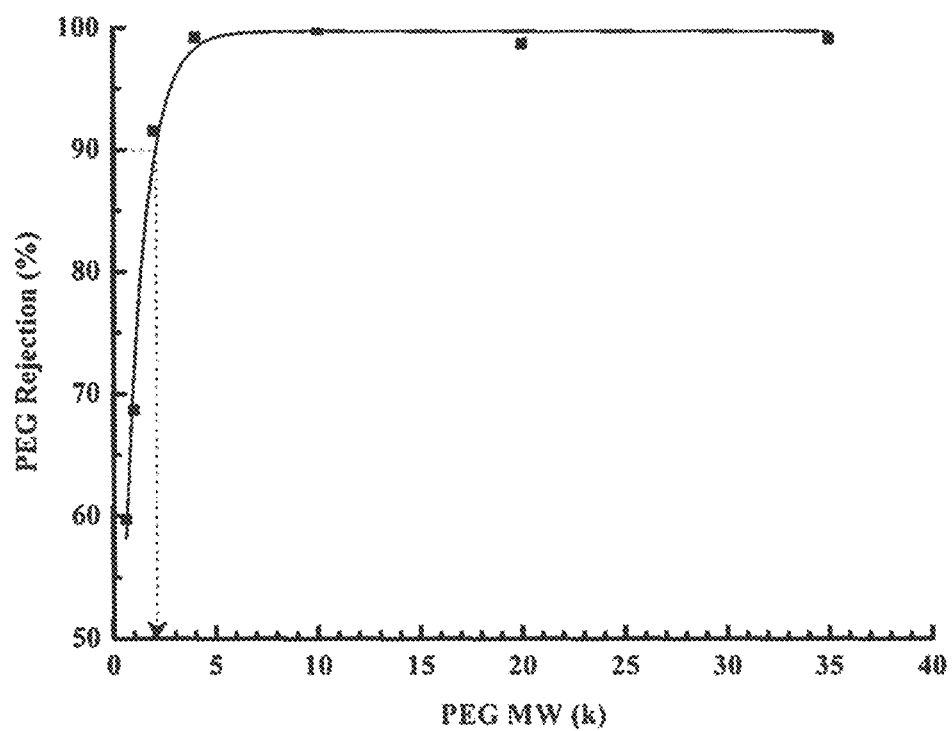
FIG. 6 depicts MWCO of membrane M-6
Figure 7:
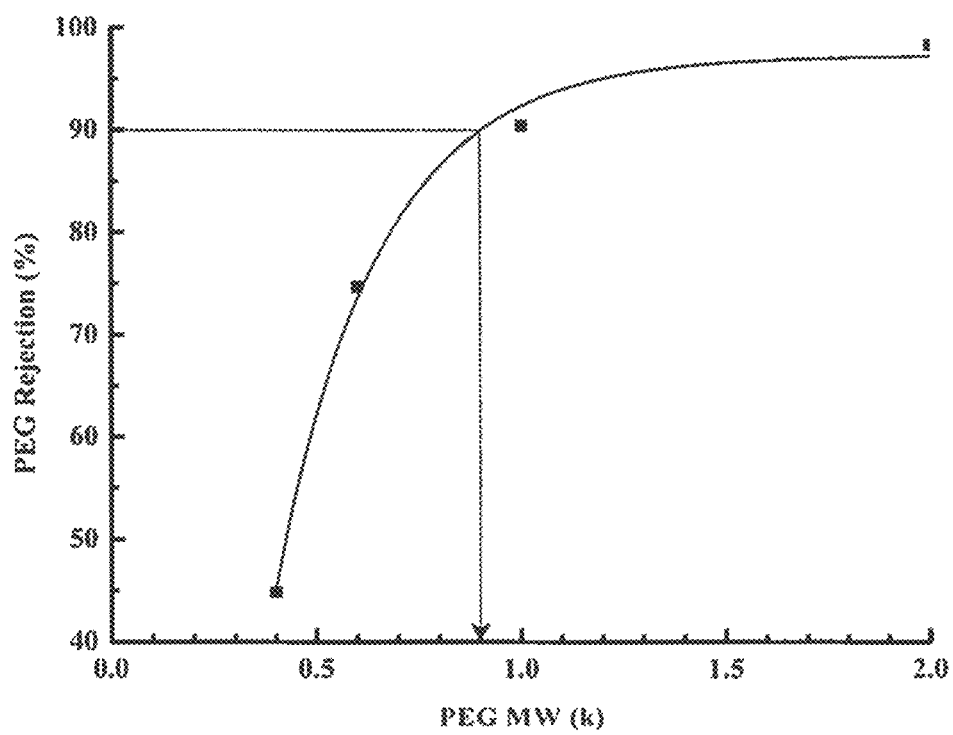
FIG. 7 depicts MWCO of membrane M-7
Figure 8:
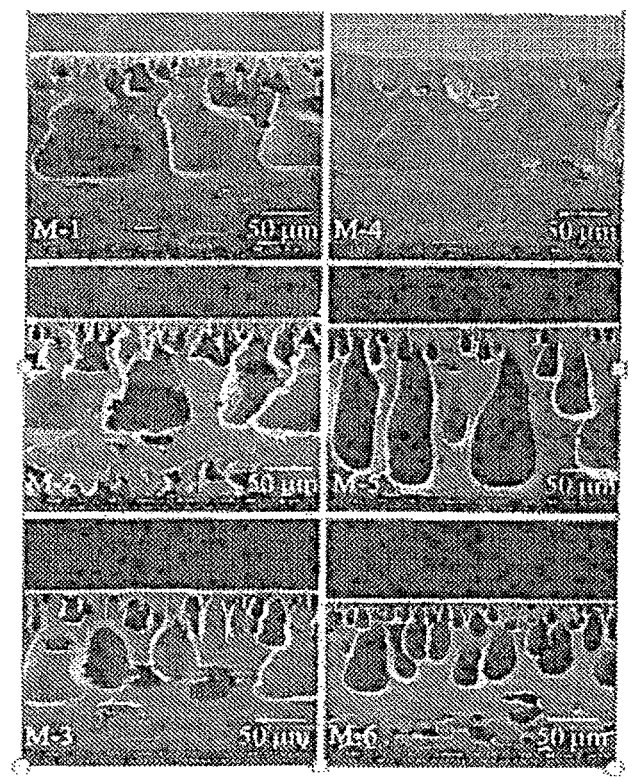
FIG. 8: SEM images of membranes M1 to M6
Figure 9A:
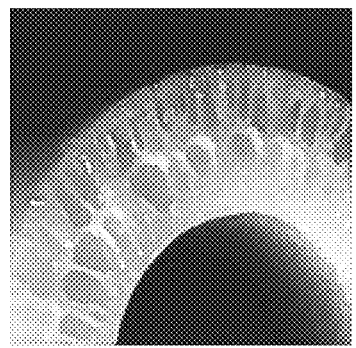
FIG. 9a: Sterio microscope image of membrane HF-5
Figure 9B:
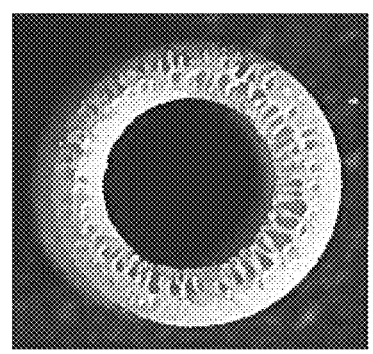
FIG. 9b: Sterio microscope image of membrane HF-7

Molecular Weight Cut off (MWCO) of different membranes was obtained by plotting PEG rejection with average molecular weight of PEG as given in FIG. 1-7 and MWCO values obtained for different membranes are summarized in Table 2.

TABLE 2

Preparation parameters of membranes as given in Example 2 and their properties

| Membrane identification | Inh. viscosity of BuPBI (dL/g) | Dope solution conc. (% w/w) | Casting speed (m/min) | Gel. tank temp. (° C.) | Rinse tank temp (° C.) | Curing tank temp. (° C.) | Avg. water flux (Jw) (lmh) | MWCO (kDa) |
|---|---|---|---|---|---|---|---|---|
| M-1 | 1.48 | 12 | 2 | 8 | 33 | 65 | 972 | 84 |
| M-2 | 1.48 | 14 | 2 | 8 | 29 | 60 | 492 | 38 |
| M-3 | 1.48 | 16 | 0.5 | 7.5 | 28 | 60 | 132 | 21 |
| M-4 | 1.48 | 16 | 2 | 6.5 | 30 | 65 | 84 | 6 |
| M-5 | 0.81 | 16 | 2 | 8.5 | 21 | 65 | 249 | 26 |
| M-6 | 0.81 | 20 | 2 | 7 | 24 | 60 | 23 | 2 |
| M-7 | 0.81 | 22 | 2 | 5.5 | 26 | 60 | 13 | 0.9 |

Example 3: Membrane Preparation with BuPBI Possessing Inherent Viscosity of 1.2 dL/g Dope solution of BuPBI with inherent viscosity of 1.2 dL/g (Table 1) was prepared in NMP as the solvent while keeping the concentration as 14% (w/v). The membranes were casted on PP or PE based non-woven support fabric (as given in Table 3) in order to obtain membranes M-8 to M-16. The knife gap was varied from 250-500 µm and casting speed was varied from 0.1-1.8 m/min, as given in Table 3. The membrane was then passed through gelation, rinsing and curing baths maintained at temperatures of 6-34° C. The membrane coupons were analyzed for water flux, which are summarized in Table 3.

TABLE 3

Preparation parameters of membranes as given in Example 3 and their properties

| Membrane Identification | Knife gap (µm) | Support fabric used | Casting speed (m/min) | Gel. tank temp. (° C.) | Rinse tank temp (° C.) | Curing tank temp. (° C.) | Avg. water flux, Jw (lmh) |
|---|---|---|---|---|---|---|---|
| M-8 | 250 | PE-3329 | 1.8 | 28 | 27 | 28 | 250 |
| M-9 | 250 | PE-3329 | 0.9 | 28 | 27 | 28 | 254 |
| M-10 | 500 | PE-3329 | 0.5 | 28 | 30 | 29.5 | 129 |
| M-11 | 500 | PE-3329 | 0.2 | 28 | 30 | 29.5 | 60 |
| M-12 | 500 | PE-3329 | 0.1 | 28 | 30 | 29.5 | 52 |
| M-13 | 350 | PP-2470 | 0.9 | 6 | 34.5 | 34.8 | 371 |
| M-14 | 350 | PP-2470 | 0.5 | 6 | 34.5 | 34.8 | 468 |
| M-15 | 350 | PP-2470 | 0.9 | 6 | 30 | 29.8 | 399 |
| M-16 | 350 | PP-2470 | 0.5 | 6 | 30 | 29.8 | 409 |

Example 4: Membranes Obtained by Preheating Before Coagulation

BuPBI of inherent viscosity of 1.2 dL/g (Table 1) was used to prepare dope solution in NMP with concentration of 14% (w/v) and casted on PP or PE based non-woven support fabric, as given in Table 4, in order to obtain membranes M-17 to M-22. The knife gap varied to 250-350 µm and casting speed was varied from 0.1-1.8 m/min. Membranes were prepared by passing through heater plate with varying temperature in the range of 100-130° C. (as give in Table 4) before entering into the gelation bath. The membrane was then passed through gelation, rinsing and curing baths maintained at temperatures as given in Table 4. The membrane coupons were analyzed for water flux and the values obtained for different membranes are given in Table 4.

TABLE 4

Preparation parameters of membranes as given in Example 4 and their properties

| Membrane Identification | Knife gap (μm) | Support fabric used | Casting speed (m/min) | Heater plate temperature (° C.) | Gel. tank temp. (° C.) | Rinse tank temp (° C.) | Curing tank temp. (° C.) | Avg. water flux (Jw, lmh) |
|---|---|---|---|---|---|---|---|---|
| M-17 | 250 | PE-3329 | 1.8 | 101 | 25 | 24.9 | 25 | 231 |
| M-18 | 250 | PE-3329 | 0.9 | 109 | 25 | 24.9 | 25 | 233 |
| M-19 | 250 | PE-3329 | 0.1 | 118 | 25 | 24.9 | 25 | 16 |
| M-20 | 350 | PP-2470 | 0.5 | 130 | 8 | 28 | 28 | 154 |
| M-21 | 350 | PP-2470 | 0.5 | 130 | 6.5 | 27.5 | 28 | 119 |
| M-22 | 350 | PP-2470 | 0.5 | 130 | 6.5 | 29 | 28.5 | 148 |

Example 5: Treatment of Membranes as Prepared in Example 3 and 4 Using N,N'-Dimethyl Acetamide (DMAc) Solution The membranes M-14 and M-21 as mentioned in Example 3 and 4, respectively were treated with aqueous solution of DMAc (25%, 50%, 70% v/v) for 24 hours (as given in Table 5), followed by drying at 100° C. for 4 days. The treated membranes were analyzed for gas permeability of He and $N_2$ The permeation data is given in Table 5.

TABLE 5

Properties of membranes as described in Example 5

| Membrane Identification | Avg. water flux (Jw) (lmh) | DMAc conc. (%) | $P_r(N_2)$ | $P_r(He)$ | $\alpha'(He/N_2)$ |
|---|---|---|---|---|---|
| M-14 | 468 | 25 | 16.6 | 42.2 | 2.5 |
| M-14 | 468 | 50 | 200 | 291 | 1.5 |
| M-14 | 468 | 70 | 270 | 337 | 1.2 |
| M-21 | 119 | 25 | $3.77 \times 10^3$ | $8.09 \times 10^3$ | 2.1 |
| M-21 | 119 | 50 | $3.36 \times 10^3$ | $7.86 \times 10^3$ | 2.3 |
| M-21 | 119 | 70 | $1.32 \times 10^4$ | $3.00 \times 10^4$ | 2.3 |

Permeance ($P_r$) expressed in GPU (1 GPU = $10^{-6}$ cm$^3$(STP)/cm$^2$ · sec · cm Hg) and selectivity ($\alpha'$), a ratio of pure gas permeance.

Example 6: Membranes Prepared with Dioxane as a Co-Solvent and Preheating Before Gelation Dope solution containing 12-15% (w/v) BuPBI of inherent viscosity 1.38 dL/g (Table 1) were prepared using NMP and dioxane mixture in defined proportions as given in Table 6. A 5% LiCl (based on polymer weight) was added and the solution was stirred for 48 hours at a temperature varying from RT to 100° C. The solution was then degassed and centrifuged. The membrane was casted on a PP or PE based non-woven support fabric to obtain membranes M-24 to M-34. The membrane casting speed was varied from 0.25 to 1.0 m/min. Membrane was passed through heater plate with varying temperature ranging from 100-130° C. before entering into the gelation bath. The membrane was then passed through gelation, rinsing and curing baths maintained at temperatures of 7-61° C. (Table 6). The membrane samples were analyzed for water flux and gas permeance as summarized in Table 6.

TABLE 6

Properties of membranes as prepared in Example 6

| Membrane identification | Dope solution conc. (%) | Solvent:co-solvent (NMP Dioxane) (%) | Backing used | Casting speed (m/min) | Heater plate temp. (° C.) | Gel. tank temp. (° C.) | Rinse tank temp. (° C.) | Curing tank temp. (° C.) | Avg. water flux (Jw) (lmh) | $P_r(N_2)$ | $P_r(He)$ | $\alpha'(He/N_2)$ |
|---|---|---|---|---|---|---|---|---|---|---|---|---|
| M-24 | 15 | 75:25 | PE-3329 | 0.9 | 120 | 30 | 29.5 | 30.5 | 167 | 98.6 | 300 | 3.0 |
| M-25 | 15 | 75:25 | PE-3329 | 0.5 | 120 | 30 | 29.5 | 30.5 | — | 76.0 | 174 | 2.3 |
| M-26 | 15 | 75:25 | PE-3329 | 0.1 | 120 | 30 | 29.5 | 30.5 | — | 57.0 | 135 | 2.4 |
| M-27 | 15 | 75:25 | PE-3329 | 0.9 | 120 | 50 | 55 | 61 | 317 | $4.78 \times 10^3$ | $9.61 \times 10^3$ | 2.0 |

TABLE 6-continued

Properties of membranes as prepared in Example 6

| Membrane identification | Dope solution conc. (%) | Solvent:co-solvent (NMP Dioxane) (%) | Backing used | Casting speed (m/min) | Heater plate temp. (° C.) | Gel. tank temp. (° C.) | Rinse tank temp. (° C.) | Curing tank temp. (° C.) | Avg. water flux (Jw) (lmh) | $P_r(N_2)$ | $P_r(He)$ | $\alpha'(He/N_2)$ |
|---|---|---|---|---|---|---|---|---|---|---|---|---|
| M-28 | 15 | 75:25 | PE-3329 | 0.5 | 120 | 50 | 55 | 61 | — | $1.85 \times 10^3$ | $4.67 \times 10^3$ | 2.5 |
| M-29 | 15 | 75:25 | PE-3329 | 0.1 | 120 | 50 | 55 | 61 | — | $3.53 \times 10^2$ | $5.03 \times 10^3$ | 1.4 |
| M-30 | 15 | 70:30 | PP-2470 | 0.5 | 120 | 7 | 25 | 26.5 | 81 | 68.7 | 174 | 2.5 |
| M-31 | 15 | 70:30 | PP-2470 | 0.5 | 150 | 7 | 25 | 26.5 | 199 | 14.3 | 33.6 | 2.3 |
| M-32 | 15 | 70:30 | PP-2470 | 0.25 | 150 | 7 | 25 | 26.5 | 13 | $4.97 \times 10^2$ | $1.45 \times 10^3$ | 2.9 |
| M-33 | 14 | 70:30 | PP-2470 | 0.5 | 130 | 8 | 21 | 23 | 35 | — | — | — |
| M-34 | 12 | 70:30 | PP-2470 | 0.5 | 130 | 9 | 21 | 26 | 90 | — | — | — |

Permeance ($P_r$) expressed is GPU, (1 GPU = $10^{-6}$ cm$^3$ (STP)/cm$^2$ · sec · cm Hg) and selectivity ($\alpha'$) is a ratio of pure gas permeance.

Example 7: Membranes Prepared with Pyridine as a Co-Solvent and Preheating Before Gelation A dope solutions (14-16% w/v) using BuPBI having inherent viscosity of 1.29 dL/g were prepared using NMP and pyridine in equal proportions. The membrane was casted on a PP or polypropylene PE based non-woven support fabric to obtain M-35 to M-51. The knife gap was adjusted to 350 μm and casting speed was varied from 0.1-0.9 m/min. Membrane was passed through heater plate with varying in temperature ranging from 120-145° C. The membrane was then passed through gelation, rinsing and curing baths maintained at temperatures of 7-30° C. (Table 7). The membrane coupons were analyzed for water flux and permeance of He and N2. The obtained data is summarized in Table 7.

TABLE 7

Preparation parameters for membranes as given in Example 7 and their properties

| Membrane identification | Dope solution conc. (%) | Backing support | Casting speed (m/min) | Heater plate temp. (° C.) | Gel. tank temp. (° C.) | Rinse tank temp (° C.) | Curing tank temp. (° C.) | Average Water flux (Jw) (lmh) | $P_r(N_2)$ | $P_r(He)$ | $\alpha'(He/N_2)$ |
|---|---|---|---|---|---|---|---|---|---|---|---|
| M-35 | 16 | PE-3329 | 0.9 | 120 | 25 | 24.5 | 26 | No flux | $7.72 \times 10^2$ | $1.63 \times 10^3$ | 2.1 |
| M-36 | 16 | PE 3329 | 0.5 | 120 | 25 | 24.5 | 26 | 1 | 130 | 174 | 1.8 |
| M-37 | 16 | PE 3329 | 0.1 | 120 | 25 | 24.5 | 26 | 27 | 159 | 306 | 2.6 |
| M-38 | 14 | PP-2470 | 0.9 | 120 | 7 | 28 | 28.5 | 106 | $7.74 \times 10^2$ | $1.50 \times 10^3$ | 2.1 |
| M-39 | 14 | PP-2470 | 0.5 | 120 | 7 | 28 | 28.5 | 32 | 108 | 277 | 2.7 |
| M-40 | 14 | PP-2470 | 0.1 | 120 | 7 | 28 | 28.5 | 11 | 193 | 454 | 2.3 |
| M-41 | 14 | PE-3329 | 0.9 | 120 | 7 | 28 | 28.5 | 109 | 98.2 | 222 | 2.8 |
| M-42 | 14 | PE-3329 | 0.5 | 120 | 7 | 28 | 28.5 | 76 | $1.43 \times 10^2$ | $3.05 \times 10^2$ | 2.8 |
| M-43 | 14 | PE-3329 | 0.1 | 120 | 7 | 28 | 28.5 | 9 | 98.2 | $2.22 \times 10^2$ | 2.2 |
| M-44 | 14 | PP-2470 | 0.5 | 120 | 7 | 29 | 29 | 71 | 322 | 614 | 2.8 |
| M-45 | 14 | PP-2470 | 0.5 | 145 | 9 | 27 | 28.5 | 39 | 233 | 522 | 2.1 |
| M-46 | 14 | PE-3329 | 0.5 | 145 | 9 | 28.5 | 29 | 31 | 261 | $1.14 \times 10^3$ | 2.4 |
| M-47 | 14 | PP-2470 | 0.5 | 95 | 7 | 27 | 28 | 35.4 | $1.07 \times 10^3$ | $2.57 \times 10^3$ | 2.40 |
| M-48 | 14 | PP-2470 | 0.5 | 120 | 7 | 27 | 28 | 26.7 | 149 | 330 | 2.21 |
| M-49 | 14 | PP-2470 | 0.5 | 145 | 7 | 27 | 28 | 19.3 | 350 | 821 | 2.35 |
| M-50 | 14 | PP-2470 | 0.25 | 145 | 7 | 27 | 28 | 11.7 | $7.24 \times 10^2$ | $1.30 \times 10^3$ | 1.80 |

TABLE 7-continued

Preparation parameters for membranes as given in Example 7 and their properties

| Membrane identification | Dope solution conc. (%) | Backing support | Casting speed (m/min) | Heater plate temp. (° C.) | Gel. tank temp. (° C.) | Rinse tank temp (° C.) | Curing tank temp. (° C.) | Average Water flux (Jw) (lmh) | $P_r(N_2)$ | $P_r(He)$ | $\alpha'(He/N_2)$ |
|---|---|---|---|---|---|---|---|---|---|---|---|
| M-51 | 14 | PP-2470 | 0.5 | 115 | 6 | 28 | 28 | 16.11 | — | — | — |

Permeance ($P_r$) expressed in GPU, (1 GPU = $10^{-6}$ cm$^3$ (STP)/cm$^2$ · sec · cm Hg) and selectivity ($\alpha'$) is a ratio of pure gas permeance.

Example 8: Treatment of Membranes Prepared as Given in Example 7

The membrane as mentioned in Example 7 viz., M-47, M-49 and M-50 were further treated with aqueous solution of DMAc 25%, 50%, 70% (v/v) for 14 hours, followed by drying at 60° C. for 24 hours. The treated membranes were analyzed for gas permeability of He and $N_2$. The permeance data is given in Table 8.

TABLE 8

Gas permeation analysis for the BuPBI membranes as described in Example 8

| | After DMAc treatment | | | | |
|---|---|---|---|---|---|
| Membrane identification | DMAc conc. (%) | Treatment duration (hr) | $P_r(N_2)$ | $P_r(He)$ | $\alpha'(He/N_2)$ |
| M-47 | 70 | 14 | $4.81 \times 10^{-3}$ | 0.248 | 51.56 |
| M49 | 50 | 14 | $5.37 \times 10^{-3}$ | 0.362 | 67.41 |
| M-50 | 25 | 14 | $1.72 \times 10^{-2}$ | 0.278 | 16.16 |

Permeance ($P_r$) expressed in GPU, (1 GPU = $10^{-6}$ cm$^3$(STP)/cm$^2$ · sec · cm Hg) and selectivity ($\alpha'$) is a ratio of pure gas permeance.

Example 9: Treatment of Membranes M-51

The membrane M-51 prepared as given in Example 7 was further treated with aqueous solution of DMAc 25%, 50% and 75% (v/v) for different period of time varied from 1-24 hours, followed by drying at 60° C. for 24 hours. The treated coupons were analyzed for gas permeability of He and $N_2$. The permeance data is given in Table 9.

TABLE 9

Gas permeation analysis of a membranes as described in Example 9

| | After DMAc treatment | | | | |
|---|---|---|---|---|---|
| | Treatment conditions | | | | |
| Membrane identification | Conc. (%) | Treatment duration (hr) | $P_r(N_2)^a$ | $P_r(He)^a$ | $\alpha'(He/N_2)$ |
| M-51 | 50 | 4 | 1.20 | 2.81 | 2.3 |
| M-51 | 50 | 2 | 0.520 | 1.43 | 2.75 |
| M-51 | 50 | 24 | 2.80 | 0.613 | 55.6 |
| M-51 | 75 | 2 | $4.80 \times 10^{-3}$ | 0.267 | 64.1 |
| M-51 | 75 | 1 | $4.40 \times 10^{-3}$ | 0.282 | 64.7 |
| M-51 | 25 | 24 | $2.10 \times 10^{-2}$ | 0.318 | 15.1 |

Permeance ($P_r$) expressed in GPU, (1 GPU = $10^{-6}$ cm$^3$(STP)/cm$^2$ · sec · cm Hg) and selectivity ($\alpha'$) is a ratio of pure gas permeance.

Example 10: Hollow Fiber Membrane Preparation

A dope solution of BuPBI with inherent viscosity of 1.33 dL/g, was prepared with concentration of 10% (w/v) using methane sulphonic acid (MSA) as the solvent while stirring for 48 hours at 100° C. The solution was then degassed and centrifuged. It was then passed through a spinneret using bore fluid as water. Dope solution pressure was varied from 0.2-1 bar while bore fluid pressure was varied from 0.05-0.15 bar. Air gap was varied from 3-33 cm. The spun hollow fibers were immersed in water for 3-5 days. They were dipped in 20 wt % aq. glycerol solution and dried in air at room temperature. These dried hollow fibers were potted to obtain hollow fiber modules. They were analyzed for their internal (ID) and external (OD) diameters, water flux and PEG rejection. The obtained results are tabulated in Table 10.

TABLE 10

Spinning conditions of BuPBI Hollow fiber membranes and their properties

| Membrane identification | Air gap (cm) | Dope solution pressure (bar) | Bore fluid pressure (bar) | Avg. ID (μm) | Avg. OD (μm) | Avg. thickness (μm) | Avg. water flux (Jw) (lmh) |
|---|---|---|---|---|---|---|---|
| HF-1 | 33 | 0.7 | 0.05 | 617 | 977 | 180 | 5 |
| HF-2 | 23 | 0.6 | 0.1 | 694 | 1031 | 169 | 6.5 |
| HF-3 | 23 | 1 | 0.08 | 521 | 900 | 184 | 7 |
| HF-4 | 3 | 0.3 | 0.05 | 293 | 514 | 111 | 10 |
| HF-5 | 3 | 0.2 | 0.13 | 922 | 1332 | 201 | 10.7 |

Example 11: Solvent Treatment of BuPBI Hollow Fiber Membranes Prepared as Given in Example 10

The BuPBI HF-3 hollow fiber membranes as mentioned in Example 10 were further treated with aqueous solution of DMAc 70% (v/v) for 12 hours, and then dried at room temperature for 24 hours. The DMAc treated and untreated hollow fibers were analyzed for gas permeation analysis at 30 psi and selectivity for $H_2/N_2$ pair. The permeation data is given in Table 11.

TABLE 11

Gas permeation analysis of hollow fiber membranes as described in Example 11

| Membrane identification | DMAc conc. (%) | Treatment duration (hr) | DMAc conc. (%) | $P_r(H_2)$ | $P_r(N_2)$ | $\alpha'(H_2/N_2)$ |
|---|---|---|---|---|---|---|
| HF-3a | — | — | — | 0.284 | 0.040 | 7.08 |
| HF-3b | 70 | 12 | 70 | 0.129 | 0.011 | 11.49 |

Permeance ($P_r$) expressed in GPU, (1 GPU = $10^{-6}$ cm$^3$ (STP)/cm$^2$ · sec · cm Hg) and selectivity ($\alpha'$) is a ratio of pure gas permeance.

Example 12. Hollow Fibre Membrane Preparation

A dope solution of BuPBI with inherent viscosity of 1.33 dL/g, was prepared with concentration of 12% (w/v) using N-methyl pyrrolidone (NMP) as the solvent in presence of 8% LiCl while stirring for 48 hours at 80° C. The solution was then degassed and centrifuged. It was then passed through a spinneret using bore fluid as water and NMP mixture (2:1). Dope solution pressure was 0.3 bar, while bore fluid pressure was 0.09 bar. Air gap was 9 cm. The spun hollow fibers were kept in water for 24 hours and then immersed in 15% aq. glycerol solution for 8 hours. They were dried in air at ambient and were potted with epoxy glue to obtain hollow fiber module. The internal diameter (ID), outer diameter (OD) and the water flux of these membranes were 0.08 cm, 0.11 cm and 23 lmh, respectively.

Example 13. Hollow Fibre Membrane Preparation (No. HF-6)

A dope solution of BuPBI with inherent viscosity of 1.1 dL/g, was prepared with concentration of 12% (w/v) using N-methyl pyrrolidone (NMP) and tetrahydrofuran (1:1) as the solvent in presence of 7% LiCl while stirring for 48 hours at 70° C. The solution was then degassed and centrifuged. It was then passed through a spinneret using water as a bore fluid. The dope solution pressure was 0.6 bar, while bore fluid pressure was 0.3 bar. For HF-7 membrane, air gap was 25 cm, while for HF-8 membrane, the air gap was 9 cm. The spun hollow fibers were kept in water for 24 hours and then dried in air at ambient. They were potted with epoxy glue to obtain hollow fiber module. The internal diameter (ID) and outer diameter (OD) of these membranes were 0.07 cm and 0.10 cm, respectively. The gas permeance of these membranes is given in Table 12.

TABLE 12

Gas permeation analysis of hollow fibers as prepared in Example 13

| Membrane identification | $P_r(H_2)$ | $P_r(N_2)$ | $\alpha'(H_2/N_2)$ |
|---|---|---|---|
| HF-7 | 2.9 | 0.045 | 64 |
| HF-8 | 5.1 | 0.22 | 23 |

Permeance ($P_r$) expressed in GPU, (1 GPU = $10^{-6}$ cm$^3$ (STP)/cm$^2$ · sec · cm Hg) and selectivity ($\alpha'$) is a ratio of pure gas permeance.

Advantages of Invention

Novel membrane, may be processed as hollow fiber of flat sheet

Wide range of applications owing to tunable porosity (nonporous to porous).

Obtained from thermo-chemically stable polymer: PBI-BuI

The invention claimed is:

1. A membrane for separation, the membrane comprising: tert-butyl-polybenzimidazole with concentration in a range of 12-22% w/v, said membrane having been configured to have a tunable porosity to separate gases or solutes based on a molecular weight of the gases or solutes, and to permit solutes with the molecular weight of 100-100,000 to be separated,
wherein said membrane is prepared by a process comprising:
    (a) preparing a dope solution of tert-butyl-polybenzimidazole (BuPBI) with viscosity of the solution being in a range of 0.4 dL/g to 4 dL/g and concentration varying from 12 to 22% (w/v) in an organic solvent;
    (b) casting the dope solution of step (a) using a knife assembly or subjecting the solution of step (a) to spinneret using a non solvent as bore fluid, or spinneret under pressure;
    (c) heating the solution of step (b) to a temperature ranging from 40-150° C. and
    (d) allowing the solution formed after either step (b) or step (c) to precipitate in a non solvent to obtain the membrane.

2. The membrane as claimed in claim 1, wherein the membrane is a flat sheet.

3. The membrane as claimed in claim 1, wherein the membrane is hollow fiber.

4. The process as claimed in claim 1, wherein the bore fluid is selected from the group consisting of water alone or at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol and water or water containing 0-35% w/v of a salt selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate.

5. The process as claimed in claim 1, wherein the non solvent is selected from the group consisting of water alone or at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol containing 0-35% w/v of a salt selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate, or water containing 0-35% w/v of a salt selected from Lithium chloride, Lithium bromide, Lithium iodide, sodium chloride, potassium chloride, potassium perchlorate, ammonium sulfate, sodium acetate, potassium acetate, sodium nitrate, potassium nitrate, sodium bromide, sodium iodide, sodium dichromate, magnesium chloride and magnesium nitrate.

6. The process as claimed in claim 1, wherein membrane formed is treated with solution of solvents comprising at least two selected from the group consisting of methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, toluene, alcohol and water, in a ratio 1:99 to 99:1, at 25-100° C. for 1 min to 4 days.

7. The process as claimed in claim 1, wherein the dope solution prepared in step a) of tert-butyl-polybenzimidazole (BuPBI) further includes a co-solvent.

8. The process as claimed in claim 7, wherein the dope solution prepared in step a) of tert-butyl-polybenzimidazole (BuPBI) further includes an additive.

9. The process as claimed in claim 7, wherein the organic solvent and co solvent consisting of at least one selected from methane sulfonic acid, N,N-dimethyl acetamide, N,N-dimethyl formamide, N-methyl pyrrolidone, dimethyl sulfoxide, acetonitrile, tetrahydrofuran, dioxane, pyridine, chloroform, dichloromethane, tetrachloromethane, dichloroethane, tetrachloroethane, cyclohexanone, methylethylketone, ethyl acetate and toluene.

10. The process as claimed in claim 8, wherein the additives employed in preparing the dope solution of tert-butyl-polybenzimidazole (BuPBI) are selected from the group consisting of alkali and alkaline earth metal salts, organic acids, polymers and oligomers.

11. The process as claimed in claim 10, wherein the alkali and alkaline earth metal salts are selected from the group consisting of lithium chloride (LiCl), lithium bromide (LiBr), Aluminium Chloride ($AlCl_3$), Potassium Chloride (KCl), Lithium Iodide L(iI), organic acids are selected from malic acid, maleic acid, citric acid, succinic acid, Malonic acid, oxalic acid; polymers and oligomers are selected from Polyethylene glycol (PEG), Polyvinyl alcohol (PVA) and Polyvinylpyrrolidone (PVP).

* * * * *